Figure 5:
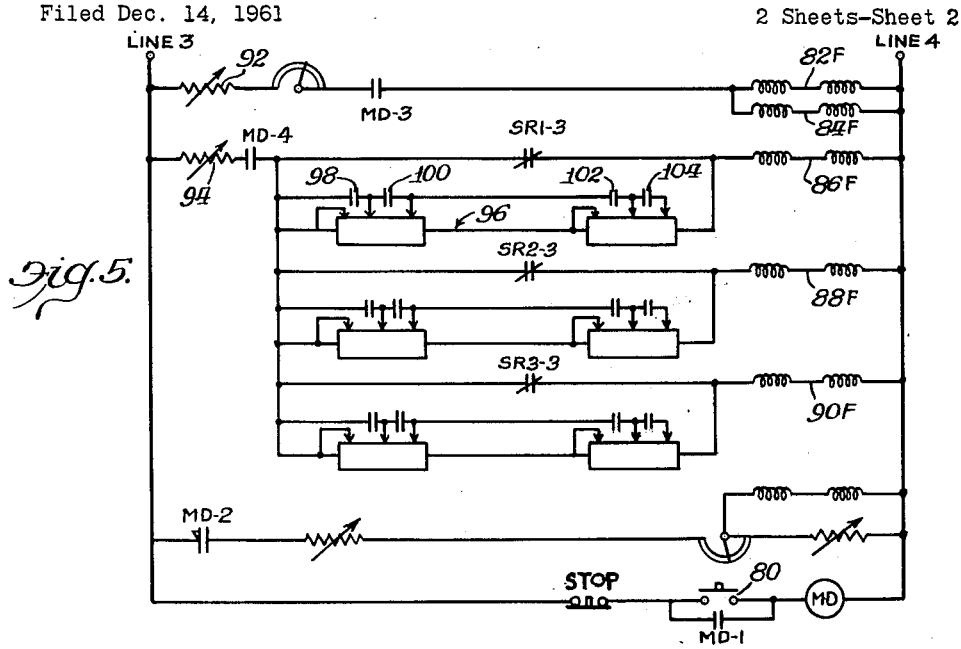

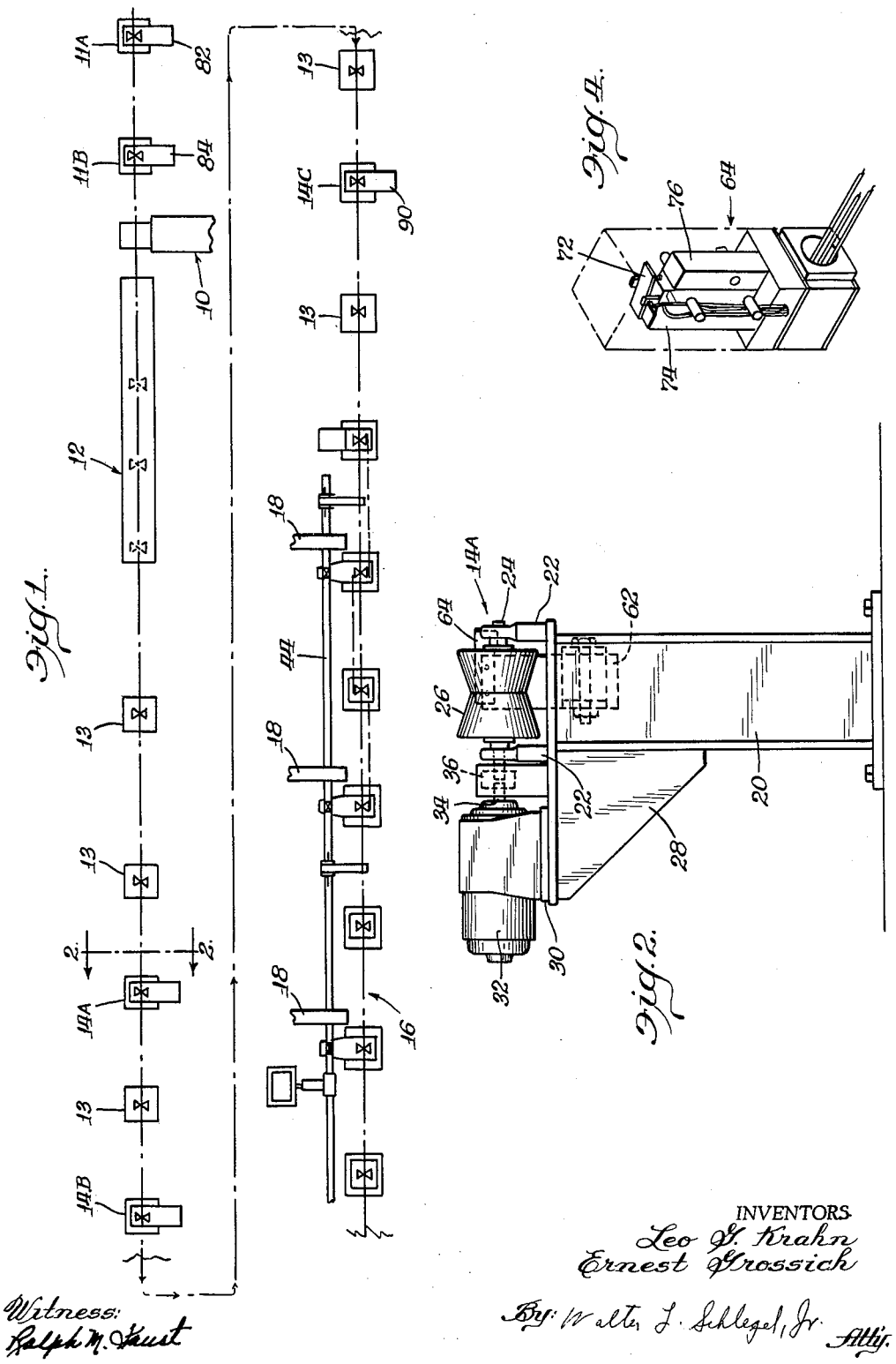

April 21, 1964 L. G. KRAHN ETAL 3,129,805
TAKE-OFF CONVEYOR
Filed Dec. 14, 1961 2 Sheets-Sheet 2

INVENTORS.
Leo G. Krahn
Ernest Grossich
By Walter S. Schlegel, Jr.
Atty.

Witness:
Ralph M. Faust

United States Patent Office 3,129,805
Patented Apr. 21, 1964

3,129,805
TAKE-OFF CONVEYOR
Leo G. Krahn, Chicago, and Ernest Grossich, River Grove, Ill., assignors to Amsted Industries Incorporated, Chicago, Ill., a corporation of New Jersey
Filed Dec. 14, 1961, Ser. No. 159,369
6 Claims. (Cl. 198—127)

This invention relates to take-off conveyors and particularly to take-off conveyors utilized to transport elongated articles, such as pipe, from one treating station to another treating station or to a loading station.

In many instances, elongated articles such as pipe must be coated with protective material to prevent corrosion of the pipe when subsequently installed in underground pipe line systems. Such protective coatings may be applied to the pipe by dipping, spraying or extruding but in most instances must be applied while hot and therefore soft. For this reason, roller conveyor systems are most frequently employed for transporting the pipe, the systems including power driven rollers having a speed determined by the speed of treatment at the first station.

In the particular arrangement contemplated herein, consecutive lengths of axially aligned pipe are moved through a treating station at which a polyethylene coating is applied by an extrusion process. Immediately after being coated, the pipe passes through a water cooling arrangement wherein the temperature of the polyethylene coating is lowered and the hardness of the coating is correspondingly increased. The coating, because of its manner of application, is continuous even though it covers a plurality of lengths of pipe. It is therefore necessary, in order to facilitate subsequent handling, that the coating be cut at the juncture of the pipe sections. The coating material must subsequently be trimmed back for a distance of three to four inches from each end of the pipe to facilitate the welding together of consecutive lengths of pipe at the time of final installation.

To accomplish the trimming operation, the lengths of coated pipe are kicked off the roller conveyor laterally thereof whereupon opposite ends of the pipe may be simultaneously trimmed. It is this trimming operation which in all known prior art installations determines the speed of the overall operation.

Investigation showed that the trimming operation, of itself, could be accomplished at a fairly fast rate. However, inasmuch as the lengths of pipe being coated were in some instances twenty to fifty or more feet long, a large time lag occurred while the trimmers waited for the full length of pipe to reach the trimming station. It was discovered that the pipe coating step could be approximately doubled if each section of pipe, after being coated, was moved to the trimming station at a rate in excess of the coating rate, thereby substantially decreasing the waiting time of the trimmers. However, in order to accommodate uniform coating and to ensure that the pipe was not pulled away from the coating station, it was found necessary to provide an arrangement wherein any conveyor roller subsequent to the coating station and in contact with a particular length of pipe moved at substantially the same speed as any other rollers in contact with that pipe.

The primary object, therefore, of the present invention is the provision of an arrangement for transporting lengths of pipe from a first to a second treating station at a substantially increased rate while still providing sufficient time to perform the treating operation at the second station.

Another object of the invention is the provision of a dual speed arrangement for transporting coated pipe wherein all pipe carrying rollers in contact with the pipe being carried are moving at the same speed.

Figure 6:
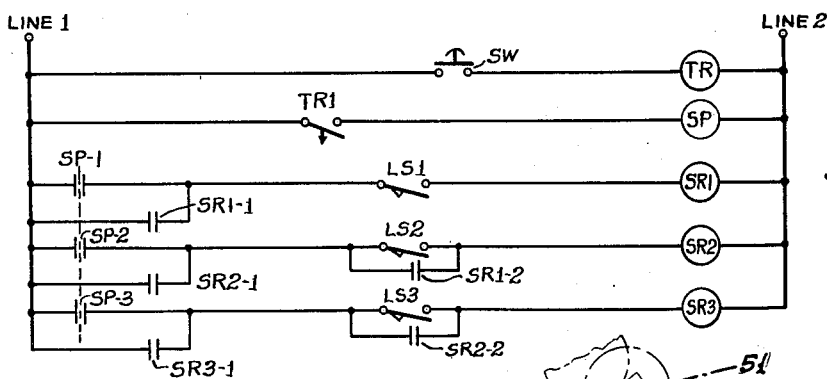
Figure 3:
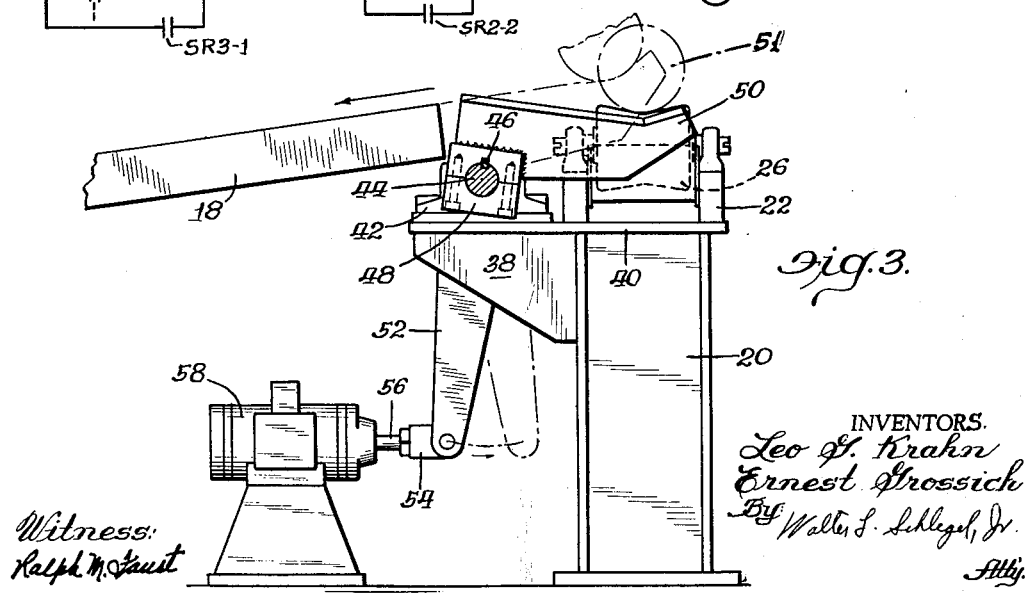

Other objects of the invention will become apparent from the following description and accompanying drawings wherein:

FIGURE 1 is a schematic layout of a pipe treating arrangement as seen in plan view;
FIGURE 2 is a view taken substantially on line 2—2 of FIGURE 1 and illustrating a drive roller station;
FIGURE 3 is an elevational view of a typical kick-out device which may be utilized to remove successive lengths of treated pipe from the main roller conveyor;
FIGURE 4 is a schematic isometric diagram of the sensing device utilized to control motor speed; and
FIGURES 5 and 6 are electrical diagrams for the conveyor arrangement.

Referring first to FIGURE 1 of the drawings, a treating station is indicated schematically at 10, and in this embodiment of the invention the station 10 is an extrusion device through which successive lengths of pipe are passed and wherein they are provided with a continuous coating of plastic material in a manner well known in the art and not, of itself, forming a part of the present invention. The uncoated pipe may be transported to the treating station in any desirable manner. However, for purposes of the present disclosure, a pair of spaced infeed drive roller assemblies 11A and 11B are shown though it will be apparent that in practice a larger number of infeed rollers are necessary to accommodate the longer of the pipes which are to be coated.

When the lengths of pipe leave the extruder they pass through a water circulating cooling trough, indicated generally at 12, and are then received on a conveyor system comprising a plurality of roller assemblies 13 and 14A, 14B and 14C. Those roller assemblies designated 13 are idler rollers whereas the roller assemblies designated 14A, 14B and 14C are individually motor driven. The roller asesmblies will be described in greater detail hereinafter in conjunction with other figures of the drawings. However, whereas only three power driven rollers are shown for purposes of illustration, in actual practice a much larger number of rollers is used in order to accommodate long lengths of pipe being coated.

Because the extruder provides a continuous coating to successive lengths of pipe, an area is provided immediately following the cooling trough wherein the coating is cut at the juncture of the trailing end of one pipe and the leading end of the next subsequent pipe.

The separated lengths of coated pipe are removed from the aligned conveyor rollers at a kick-out station indicated generally at 16. At this station the pipe lengths are moved transversely of their original line of travel and are received on skids 18. At this point a pair of operators, stationed at opposite ends of a pipe, trim off approximately four inches of coating material in order to bare that amount of pipe for subsequent joining, as by welding, to other lengths of pipe at the time of installation.

The roller assemblies 13 and 14A, 14B and 14C are identical except for the provision in the latter assemblies of motor means for driving the rollers. For this reason only one such assembly shall be described in detail. Each roller assembly comprises a suitable frame 20 (FIGURE 2) on which are mounted spaced pillow block bearings 22 arranged to receive a rotatable shaft 24 to which is secured a pipe carrying roller 26 preferably having its peripheral face in the form of a shallow V adapted to carry pipe in a range of approximately one-half inch in diameter to approximately six inches in diameter.

The foregoing description is typical of idler roller assemblies 13, and such an idler roller assembly is also shown in FIGURE 3 in conjunction with the kick-out arrangement. Roller assemblies 14A, 14B and 14C are additionally provided with a mounting bracket 28 to which may be bolted a motor mount 30 arranged to carry a drive motor 32. Preferably, motor 32 is a constant speed, D.C. gearmotor controlled through switch operated relays whereby motor field resistance is varied to effect desired motor speed. The shaft 34 of motor 32 is coupled as at 36 to shaft 24 whereby each roller 26 is rotated at the desired preselected speed.

The kick-out arrangement 16, which forms no part of the present invention, is shown in FIGURE 3 which also illustrates a typical idler roller assembly including a frame 20, bearings 22 and roller 26. Welded or otherwise secured to frame 20 is a gussett 38 which aids in supporting an elongated top plate 40 to which is bolted a pillow block bearing 42 arranged to rotatably receive an elongated shaft 44 which, as best seen in FIGURE 1, extends substantially the full length of the kick-out station and is supported by pillow block bearings at alternate roller assemblies. Keyed as at 46 to shaft 44 for rotation therewith is a split pivot block 48 to which is preferably welded a kick-out arm 50 extending into alignment with roller 26 and across the path of roller carried lengths of pipe one of which is shown in phantom at 51. Also keyed to shaft 44 for driving the latter is pivot arm 52 which is pivoted at its lower end to a clevis 54 secured to the outer end of cylinder rod 56. The rod 56 is actuated by a double acting air cylinder 58. Cylinder 58 moves the rod 56 from one position (shown by solid lines in FIGURE 3) wherein the outer end of arm 50 has its top surface immediately below the pipe carrying surface of roller 26, to a second position (shown by the phantom lines in FIGURE 3) wherein the arm 50 is rotated in a counter clockwise direction to the position shown by phantom lines whereupon a pipe being supported by roller 26 is lifted from the roller and caused to roll onto a plurality of skid members 18 (FIGURES 1 and 3). At least two such kickout assemblies must be furnished so that each pipe to be kicked-out is supported at a minimum of two spaced points.

Each driver roller assembly frame has pivotally secured thereto a switch bracket 62 (FIGURE 2) arranged to carry a proximity switch 64. Switch 64 is normally positioned at a level immediately below the uppermost surface of each roller 26 so as not to be contacted by the coated pipe traveling on the rollers. The switch, however, is mounted on a pivotal bracket to eliminate the possbility of damage to the switch should there be some obstruction on the pipe projecting below the top surface of a pipe carrying roller.

The preferred proximity switch, or sensing device, is shown, partially in phantom, in FIGURE 4 and is conventional, readily available device. Referring to FIGURE 4 it is seen that a magnetic steel armature 72 is positioned within the field of two permanent magnets 74 and 76 in such a manner that magnet 74 holds the armature captive and establishes a normally closed circuit. The other magnet 76 provides a contrabiasing force that in itself is not quite capable of moving the armature. The introduction of a piece of ferrous material to the sensing area that is located on the normally closed contact side of the switch causes enough flux lines from this holding magnet 74 to be shunted away from the armature to allow the biasing force of magnet 76 to become relatively larger and cause a snap action movement of the armature. The magnets 74 and 76 are assembled with like poles closest to armature 72 thereby allowing the switch to operate in external magnetic fields and also permitting mounting directly to a steel surface since the magnets are similarly effected and the unbalanced flux condition is not upset.

The manner of operation of the present arrangement can be best explained in conjunction with a description of the electrical wiring diagram of FIGURES 5 and 6. Assuming that the extrusion coating station is ready to operate and uncoated lengths of pipe are ready to be fed onto infeed rollers 11A and 11B, the machine operator depresses start button 80 (FIGURE 5) to complete a circuit through the coil of relay MD whereby normally open relay contacts MD–1, MD–2, MD–3 and MD–4 are closed. Closing contacts MD–1 creates a holding circuit whereby relay MD remains energized after start button is released. Closing contacts MD–2 completes a circuit to energize the generator shunt field of a conventional motor generator set. Closing contacts MD–3 and MD–4 completes circuits causing the conveyor infeed roller motors 82 and 84 and conveyor take-off roller motors 86, 88 and 90 to accelerate to a speed determined by the settings of speed potentiometers 92 and 94 respectively. The motors are shown diagrammatically in FIGURE 1 and are represented by their respective field coils in FIGURE 5, the field coils being designated 82F, 84F, 86F, 88F and 90F. The speed of the infeed rollers should be slightly faster than the original base speed of the take-off rollers to maintain a slight pressure of each pipe length against the immediately preceding pipe length to ensure that consecutive lengths of pipe remain in contact during the coating operation.

As the leading pipe emerges from the coating station its front end successively passes over a plurality of take-off assemblies, for example 14A and 14B and in so doing actuates the associated proximity switches 64 to close contacts LS1 and LS2 (FIGURE 6). For purposes of illustration we may assume that, because of the length of pipe being coated, several roller assemblies, represented in this instance by assembly 14C, have not been reached by the coated pipe. When the end of the leading pipe reaches the cutting station immediately following cooling through 12, the coating is severed at the juncture of the leading pipe and the following pipe. After the pipe lengths have been separated from each other, switch SW is depressed to complete a circuit through timing relay TR, closing contacts TR–1, which will open automatically after a predetermined short interval of time. Closing contacts TR–1 energized the coil of relay SP and closes normally open contacts SP–1, SP–2 and SP–3. A circuit is now completed from line 1 through contacts SP–1 and LS1 and the coil of relay SR1 to line 2 whereby normally open contacts SR1–1 and SR1–2 are closed while normally closed contacts SR1–3 are opened. A holding circuit is thereby provided through contacts SR1–1 to keep relay SR1 energized after contacts SP–1 open as described heretofore. A circuit at this time will also have been completed from line 1 through contacts SP–2, contacts LS2 and the coil of relay SR2 to line 2 to close normally open contacts SR2–1 and SR2–2 while opening normally closed contacts SR2–3. Closed contacts SR2–1 form a holding circuit to keep relay SR2 energized after contacts SP–2 open. Closing contacts SR2–2 completes a circuit through contacts SP–3 and SR2–2 and the coil of relay SR3 to close normally open contacts SR3–1 and open normally closed contacts SR3–3. The same sequence of actions will occur, almost simultaneously, for any additional number of roller assemblies which may be provided so that the associated SR relays are energized whether or not the associated rollers have been reached by the coated pipe.

It is seen from the foregoing description that all of a plurality of contacts in the motor control circuit of FIGURE 5, namely contacts, SR1–3, SR2–3, SR3–3 and so on for as many take-off roller assemblies as may be employed, are practically simultaneously opened.

Referring now to FIGURE 5, the motors which drive the rollers of assemblies 14A, 14B and 14C are schematically represented by motor shunt field coils 86F, 88F and 90F. When, for example, contacts SR1-3 are opened the resistance through the motor field circuit is increased because of the inclusion therein of a manually adjustable resistance circuit indicated generally at 96. By manually closing contacts 98, 100, 102 and 104 the speed of the roller motor may be increased by selected increments above base speed. For example, if all these contacts are closed the base speed is increased by 15%; if contacts 100, 102, and 104 are closed the resistance is further increased to provide a speed equal to 130% of the base speed. Similarly, closing only contacts 102 and 104, or contacts 104 only, increases the speed to 145% and 160% of the base speed, respectively. If all four contacts 98, 100, 102 and 104 are open, the full resistance of the resistance circuit is applied and the speed of the roller drive motor is increased to 175% of the base speed. In the same manner the motors of all driven rollers in contact with the coated pipe are simultaneously speeded up to quickly move the pipe to the kick-off station. The manually adjustable resistance circuit is conventional and of itself forms no part of the present invention.

If now, the speeded-up rollers carrying the coated pipe to kick-out station were maintained at the same speed until the pipe reached that station, the next following pipe would be received on these rollers and there would be, first, a tendency to pull the pipe forward at too fast a rate to accommodate proper coating. Furthermore, there would be a great amount of slippage of the more rapidly moving rollers on the coated pipe with possible damage to the coating. The provision of the proximity switch obviates this speed differential in the following manner. When the trailing end of the first pipe passes a roller assembly, for example roller assembly 14A, proximity switch contacts LS1 open, in the manner explained heretofore, dropping out relay SR1 and thereby closing contacts SR1-3. The speed of roller motor 86 is thus reduced to the original base rate and is ready to receive another pipe. In like manner, when the trailing end of the first pipe passes roller assembly 14B, proximity switch contacts LS2 open whereupon roller 88 slows down to the base speed. The same action occurs in sequential steps for each power driven roller assembly which is passed by the trailing end of a coated pipe.

It is seen, therefore, that all rollers in contact with a length of coated pipe at any particular instant are all rotating at the same speed, while at the same time, lengths of pipe which have just been coated are moved speedily to the next operating station. The arrangement disclosed herein has enabled the production rate for coating lengths of pipe to be almost doubled. It will be understood that the invention disclosed herein, though explained in detail with reference to coated lengths of pipe, is not intended to be limited thereto.

We claim:

1. A conveyor arrangement for transporting, from a first treating station to a second treating station along a path, a plurality of axially aligned substantially abutting elongated articles comprising: a plurality of spaced rollers; individual means for driving each of said rollers at a predetermined speed; control means responsive to an article passing over at least one roller for increasing the speed of said one roller and all other rollers between said first and said second treating station, said control means being responsive to the trailing end of an article passing an associated roller for decreasing the speed of the associated roller to said predetermined speed.

2. A conveyor arrangement for moving a plurality of axially aligned elongated articles through a first treating station substantially in abutting end to end relationship to a second treating station in spaced relationship, said arrangement comprising: a plurality of aligned rollers; power means for individually driving each of said rollers; an electrical circuit for controlling the speed of said power means comprising switch means associated with each of said rollers, each of said switch means being movable to a first position responsive to an article carried on the associated roller; means operable, when any of said switch means are in said first position, for speeding up all of said power means; each of said switch means being movable, when the trailing end of an article has passed the associated roller, to a second position wherein the speed of the associated roller is decreased.

3. In a conveyor arrangement having at least a first, second and third roller means for supporting and transporting an article; a first, second and third electric motor for driving said first, second and third roller means, respectively, at a first predetermined speed; a manually controlled electrical circuit for simultaneously increasing the speed of all of said electric motors to a second predetermined speed; first, second and third proximity switches mounted near said first, second and third roller means, respectively; and control circuit means connecting said first, second and third electric motors to said first, second and third proximity switches for sequentially reducing the speed of said first, second and third motors to said first predetermined speed as said article sequentially passes said first, second and third proximity switches, respectively.

4. A control system for a conveyor arrangement having a plurality of electric motor driven roller means for supporting and transporting an article, comprising: a manually actuated circuit for simultaneously increasing the speed of all said electric motors; a plurality of proximity switches placed along said conveyor at spaced intervals actuated by the presence thereby of said article; and additional circuit means connecting said proximity switches to said electric motors for sequentially reducing the speed of each of said electric motors, one at a time, to that speed at which said electric motors were operating prior to said increase of speed.

5. In a conveyor arrangement having at least a first, second and third roller means for supporting and transporting an article; a first, second and third motor means for driving respective roller means at a first predetermined speed; a resistance circuit associated with each of said motor means; means for inserting said resistance circuits into series relationship with the respective motor means substantially simultaneously for increasing the speed of all of said roller means to a second predetermined speed; first, second and third proximity switches for taking said resistance circuits out of series relationship with said motor means for sequentially reducing the speed of said first, second and third roller means to said first predetermined speed as said article sequentially passes said first, second and third proximity switch, respectively.

6. In a conveyor arrangement having at least a first, second and third roller means for supporting and transporting an article; a first, second and third motor for driving respective roller means at a predetermined speed; a first, second and third set of normally closed contacts in series with respective motors; first, second and third adjustable resistance means wired in parallel with said first, second and third contacts, respectively; a first, second and third proximity switch mounted near said first, second and third roller means respectively, said proximity switches being normally open and movable to closed position by said article moving onto the associated roller means; a first relay wired in series with said first proximity switch, said relay controlling said first normally closed contacts and having first normally open bypass contacts in parallel with said second proximity switch; a second relay wired in series with said second proximity switch, said second relay controlling said second normally closed contacts and having second normally open bypass contacts in parallel with said third proximity switch; a third relay wired in series with said third proximity swtch, said relay controlling said third normally closed contacts; and means operable, when said first proximity switch is closed, for energizing said first relay whereby said bypass contacts are closed and said first, second and third contacts are opened for inserting said adjustable resistance means into series relationship with the respective motors to increase the speed thereof; said first, second and third relays being sequentially de-energized as said article passes sequential proximity switches whereby said first, second and third contacts are sequentially closed and the speed of the motors sequentially reduced to the first speed thereof.

References Cited in the file of this patent

UNITED STATES PATENTS

| | | |
|---|---|---|
| 1,743,044 | Morgan | Jan. 7, 1930 |
| 1,848,102 | Blair | Mar. 8, 1932 |
| 2,544,467 | Michel | Mar. 6, 1951 |

FOREIGN PATENTS

| | | |
|---|---|---|
| 214,663 | Australia | Dec. 20, 1956 |